US012809019B2

(12) United States Patent
Van Wiemeersch et al.

(10) Patent No.: US 12,809,019 B2
(45) Date of Patent: Nov. 24, 2026

(54) SYSTEMS AND METHODS FOR ULTRA WIDEBAND-BASED INCLINATION SENSING

(71) Applicant: Ford Global Technologies, LLC, Dearborn, MI (US)

(72) Inventors: John Robert Van Wiemeersch, Novi, MI (US); Vivekanandh Elangovan, Canton, MI (US); Ryan Hanson, Livonia, MI (US); Ryan Gorski, Grosse Pointe Farms, MI (US)

( * ) Notice: Subject to any disclaimer, the term of this patent is extended or adjusted under 35 U.S.C. 154(b) by 297 days.

(21) Appl. No.: 18/149,580

(22) Filed: Jan. 3, 2023

(65) Prior Publication Data

US 2023/0251372 A1 Aug. 10, 2023

Related U.S. Application Data

(60) Provisional application No. 63/267,583, filed on Feb. 4, 2022.

(51) Int. Cl.

| | |
|---|---|
| ***G01S 13/88*** | (2006.01) |
| ***B60R 25/30*** | (2013.01) |
| ***G01S 13/02*** | (2006.01) |
| ***G01S 13/08*** | (2006.01) |
| ***G01S 13/87*** | (2006.01) |

(52) U.S. Cl.

CPC ........ *G01S 13/886* (2013.01); *G01S 13/0209* (2013.01); *G01S 13/08* (2013.01); *G01S 13/87* (2013.01); *B60R 25/30* (2013.01)

(58) Field of Classification Search

CPC .... G01S 13/886; G01S 13/0209; G01S 13/08; G01S 13/87; G01S 13/931; B60R 25/30; B60B 2900/3318

See application file for complete search history.

(56) References Cited

U.S. PATENT DOCUMENTS

| | | | | |
|---|---|---|---|---|
| 11,214,196 B1 * | 1/2022 | Hadir | H04N 23/695 | |
| 11,747,459 B2 * | 9/2023 | Klar | G01S 13/343 | 342/59 |
| 2003/0112174 A1 * | 6/2003 | Kim | G01S 13/42 | 342/107 |
| 2007/0080792 A1 * | 4/2007 | Fukagawa | B60R 25/33 | 340/429 |
| 2016/0142596 A1 * | 5/2016 | DePaschoal | H04N 23/63 | 348/38 |

(Continued)

OTHER PUBLICATIONS

Bimmerforums [flyfishvt]. (Oct. 15, 2007). Alarm sensor locations. [Online forum post]. (Year: 2017).*

(Continued)

*Primary Examiner* — Ladimir Magloire
*Assistant Examiner* — Anna K. Gosling
(74) *Attorney, Agent, or Firm* — Frank Lollo; Eversheds Sutherland (US) LLP

(57) ABSTRACT

A vehicle including a first ultra-wideband (UWB) sensor and a second UWB sensor is disclosed. The first UWB sensor may be positioned at a vehicle front portion, and the second UWB sensor may be positioned at a vehicle rear portion. The vehicle may further include a memory and a processor configured to receive at least one of a first signal from the first UWB sensor and a second signal from the second UWB sensor. The processor may be configured to determine whether the vehicle is at an incline position based on at least one of the first signal and the second signal.

17 Claims, 8 Drawing Sheets

(56) References Cited

U.S. PATENT DOCUMENTS

| | | | | |
|---|---|---|---|---|
| 2016/0185218 | A1* | 6/2016 | Itoo | B60K 17/34 180/247 |
| 2017/0160392 | A1* | 6/2017 | Brisimitzakis | G01S 7/24 |
| 2022/0089148 | A1* | 3/2022 | Ahn | G01S 13/931 |
| 2023/0132643 | A1* | 5/2023 | Valentin | B65G 69/005 414/401 |

OTHER PUBLICATIONS

Eric. (2021). I have an Audi A4 B8, with a vehicle inclination sensor error showing VCDS. JustAnswer. (Year: 2021).*
Ruff, M. (Apr. 20, 2021). Everything you need to know about ride height sensors. GarageWire. (Year: 2021).*

* cited by examiner

SYSTEMS AND METHODS FOR ULTRA WIDEBAND-BASED INCLINATION SENSING

CROSS-REFERENCE TO RELATED APPLICATIONS

This application claims priority to and the benefit of U.S. provisional application No. 63/267,583, filed Feb. 4, 2022, which is hereby incorporated by reference herein in its entirety.

TECHNICAL FIELD

The present disclosure relates to an inclination sensing system and method, and more particularly, to a vehicle inclination sensing system and method to determine whether a vehicle is at an incline by using vehicle ultra-wideband sensors.

BACKGROUND

Some vehicles include a sensing module that may detect unauthorized vehicle access or unusual vehicle activity such as glass breakage, cabin activity, vehicle inclination changes, etc. The sensing module may include ultrasonic sensors, micro-electromechanical system (MEMS) sensors, and/or the like, to detect the unusual vehicle activity. For example, the ultrasonic sensors may detect cabin activity and the MEMS sensors may detect relative vehicle inclination changes.

While the sensing module may provide benefits to vehicle users, the sensing module may consume vehicle space and draw significant vehicle energy. Further, the sensing module may require a rigorous calibration process for each new vehicle platform and different cabin interiors. In addition, conventional sensing modules may be susceptible to inaccurate detection of unusual vehicle activity, which may result in a false alarm.

Thus, there is a need for a system and method that may accurately detect unusual vehicle activity without drawing significant vehicle energy.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
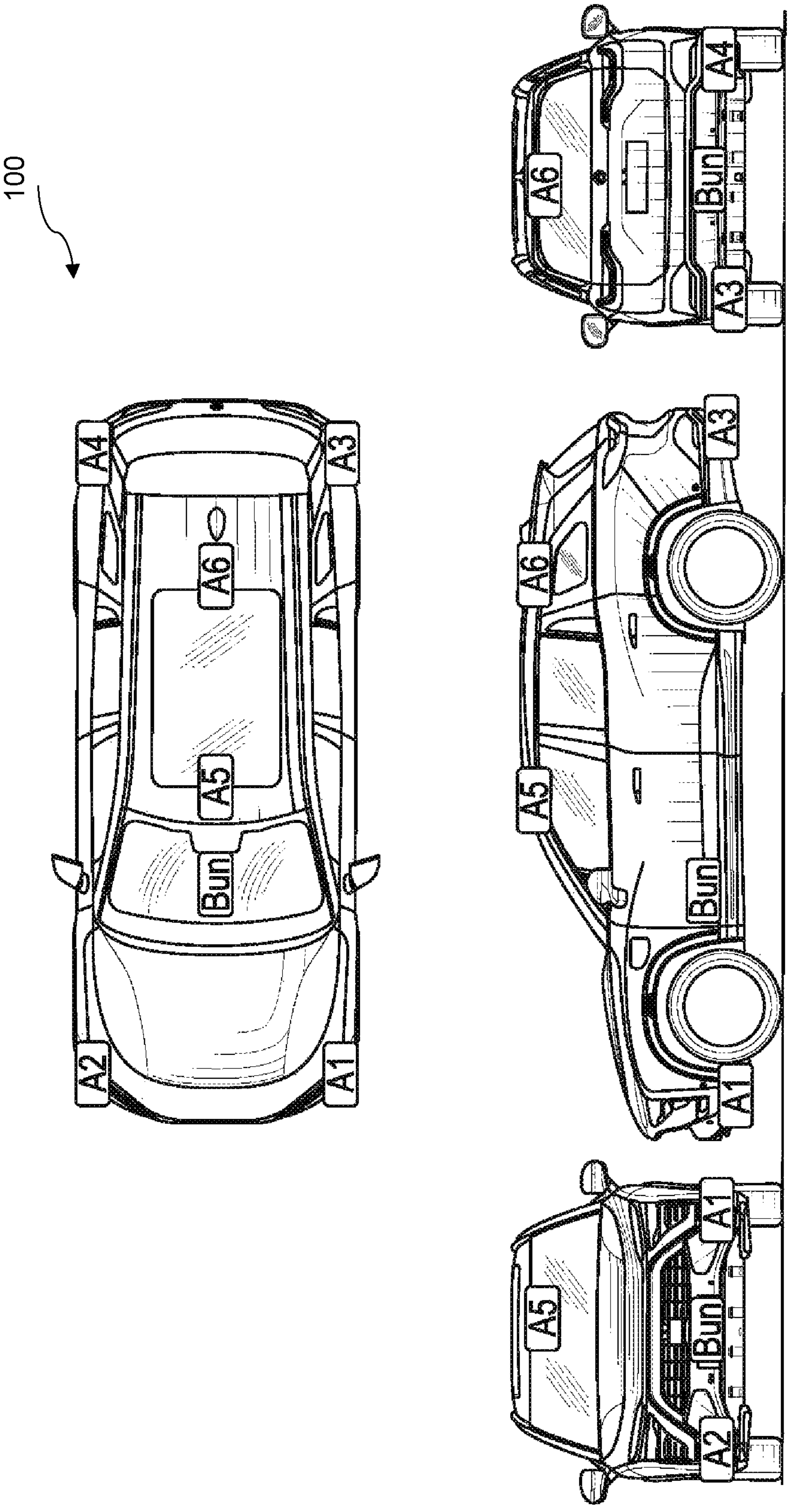
FIG. 1 depicts an example vehicle in which techniques and structures for providing the systems and methods disclosed herein may be implemented.

The present disclosure describes an ultra-wideband (UWB)-based inclination detection system. The system may utilize UWB transceivers/sensors located in a vehicle in a radar mode to detect if the vehicle is at an incline relative to a baseline (for example, an initial parking surface, such as the ground underneath the vehicle) and/or is undergoing activity indicative of the vehicle placement on cinderblocks to assist in wheel theft. In some aspects, the system may also be applicable to any other application of UWB for purposes of monitoring other unauthorized vehicle activity.

In particular, one or more UWB sensors may measure distance between the respective UWB sensor and the ground underneath the vehicle. Responsive to measuring the distance(s), a vehicle processor may compare the distance(s) with respective UWB sensor threshold value(s). The threshold value(s) may indicate a baseline distance between the UWB sensor and the ground, e.g., when the vehicle may have been initially parked on the ground. The vehicle processor may then determine whether the vehicle is at the incline based on the comparison. For example, if the measured distance is greater or less than the threshold value, the vehicle processor may determine that the vehicle may be at the incline.

In some aspects, the vehicle processor may activate vehicle UWB sensors in a plurality of modes. For instance, in a first mode, the vehicle processor may activate a first UWB sensor and determine whether the vehicle is at the incline using signals received from the first UWB sensor. In this mode, the vehicle processor may activate a second UWB sensor subsequently, when the vehicle processor determines that the vehicle is at the incline using the first UWB sensor. The vehicle processor may activate the second UWB sensor to ensure or to gain confidence that the vehicle is at the incline. In a second mode, the vehicle processor may activate the first UWB sensor and the second UWB sensors alternatively to determine whether the vehicle is at the incline.

In additional aspects, the vehicle processor may activate the first UWB sensor to provide signal samples at a first predetermined rate in the first mode. In addition, the processor may activate the first UWB sensor and the second UWB sensor to provide signal samples a second predetermined rate in the second mode. The first predetermined rate may be different from the second predetermined rate.

The systems and methods described herein may eliminate the need for a conventional sensing module that may be included in the vehicle for inclination sensing, other vehicle activity by an unauthorized person, etc. The present disclosure utilizes existing UWB sensors installed in the vehicle, and thus may not require additional sensing modules to detect vehicle inclination or other unusual vehicle activity. In addition, the present disclosure may be used to keep the key off load (KOL) down to 50% (or any other percentage) of conventional vehicle inclination sensing systems. Further, the present disclosure may reduce calibration steps that may otherwise be associated with conventional sensing modules.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example vehicle 100 in which techniques and structures for providing the systems and methods disclosed herein may be implemented. The vehicle 100 may take the form of any passenger or commercial vehicle such as, for example, a car, a work vehicle, a crossover vehicle, a van, a minivan, a taxi, a bus, etc. Further, the vehicle 100 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

The vehicle 100 may include a plurality of ultra-wideband (UWB) sensors (such as UWB sensors A1-A6). The terms "UWB sensor," "UWB transceiver," "UWB anchor," "UWB module," or the like may be used interchangeably herein. The UWB sensors A1-A6 may be installed at different positions in the vehicle 100, as shown in FIG. 1. Though six UWB sensors are shown in FIG. 1, in other cases, more than, or less than, six UWB sensors may be employed.

In some aspects, the UWB sensors A1-A4 may be located in vehicle 100 exterior portion, and the UWB sensors A5, A6 may be located in vehicle 100 interior portion. For example, the UWB sensor A1 may be mounted on a driver side front bumper, A2 may be mounted on a passenger side front bumper, A3 may be mounted on a driver side rear bumper, and A4 may be mounted on a passenger side rear bumper. In some aspects, one or more UWB sensors may perform vehicle inclination sensing, for example, by using one or more exterior UWB sensors A1-A4. In further aspects, the vehicle 100 may include a BUN (for example, BLE, UWB, and/or NFC) module that may have a UWB transceiver. Depending on vehicle 100 size, the BUN and one UWB anchor (for example, A5 or A6 and/or any other UWB anchor) may perform cabin activity sensing.

In some aspects, a vehicle processor (not shown) may be configured to receive signals from one or more UWB sensors, and may detect vehicle inclination or other vehicle activity that may be performed by an unauthorized person. For example, the vehicle processor may detect whether the vehicle 100 is at an incline relative to a baseline (for example, an initial parking surface, such as the ground underneath the vehicle 100) and/or is undergoing activity indicative of vehicle 100 placement on cinderblocks to assist in wheel theft or push-away theft.

In further aspects, the vehicle processor may activate one or more UWB sensors in different modes to detect the above-mentioned vehicle activity. The details of such detection may be understood in conjunction with FIGS. 2-8.

Figure 2:
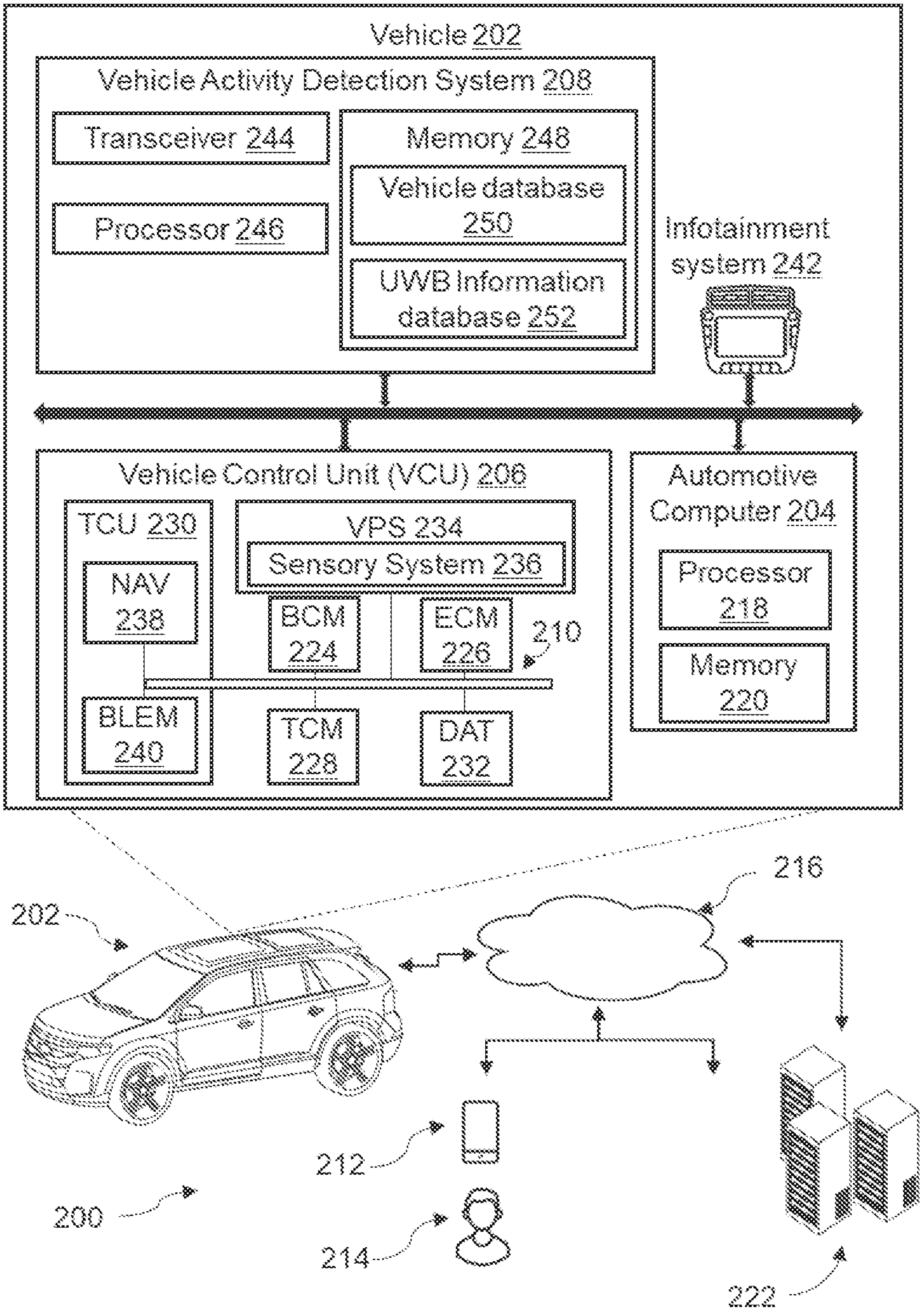
FIG. 2 illustrates a block diagram of an example system to detect unauthorized vehicle activity, in accordance with the present disclosure.

FIG. 2 illustrates a block diagram of an example system 200 to detect unauthorized vehicle activity, in accordance with the present disclosure.

The system 200 may include a vehicle 202, which may be same as the vehicle 100. The vehicle 202 may include an automotive computer 204, a Vehicle Control Unit (VCU) 206, and a vehicle activity detection system 208. The VCU 206 may include a plurality of Electronic Control Units (ECUs) 210 disposed in communication with the automotive computer 204 and/or the vehicle activity detection system 208.

The system 200 may further include a mobile device 212 that may connect with the automotive computer 204 and/or the vehicle activity detection system 208 by using wired and/or wireless communication protocols and transceivers. The mobile device 212 may associated with a user 214 (e.g., a vehicle 202 owner). The mobile device 212 may be, for example, a mobile phone or a smartphone, a tablet, a smartwatch, a laptop, a computer, a wearable communication device or any other similar device with wired/wireless communication capabilities. The mobile device 212 may communicatively couple with the vehicle 202 and may execute a phone-as-a-key (PaaK) application ("app") to access vehicle 202 functions, via one or more network(s) 216, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

The network(s) 216 illustrates an example communication infrastructure in which the connected devices discussed in various embodiments of this disclosure may communicate. The network(s) 216 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the vehicle activity detection system 208 may be installed in a vehicle engine compartment (or elsewhere in the vehicle 202), in accordance with the disclosure. Further, the automotive computer 204 may operate as a functional part of the vehicle activity detection system 208. The automotive computer 204 may be or include an electronic vehicle controller, having one or more processor(s) 218 and a memory 220. Moreover, the vehicle activity detection system 208 may be separate from the automotive computer 204 (as shown in FIG. 2) or may be integrated as part of the automotive computer 204.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing a vehicle access program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In addition, the automotive computer 204 and/or the vehicle activity detection system 208 may be disposed in communication with one or more server(s) 222 and the mobile device 212. The server(s) 222 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In some aspects, the server 222 may host the PaaK app that may be installed on the mobile device 212.

In accordance with some aspects, the VCU 206 may share a power bus with the automotive computer 204 and the vehicle activity detection system 208, and may be configured and/or programmed to coordinate the data between vehicle 202 systems, connected servers (e.g., the server(s) 222), and other vehicles (not shown in FIG. 2) operating as part of a vehicle fleet. The VCU 206 can include or communicate with any combination of the ECUs 210, such as, for example, a Body Control Module (BCM) 224, an Engine Control Module (ECM) 226, a Transmission Control Module (TCM) 228, a telematics control unit (TCU) 230, a Driver Assistances Technologies (DAT) controller 232, etc. The VCU 206 may further include and/or communicate with a Vehicle Perception System (VPS) 234, having connectivity with and/or control of one or more vehicle sensory system(s) 236. The vehicle sensory system 236 may include one or more vehicle sensors including, but not limited to, door sensors, seat sensors, vehicle proximity sensors, tire pressure sensors, cameras etc.

In some aspects, the VCU 206 may control vehicle 202 operational aspects and implement one or more instruction sets received from the mobile device 212, including instructions operational as part of the vehicle activity detection system 208.

The TCU 230 may be configured and/or programmed to provide vehicle connectivity to wireless computing systems onboard and off board the vehicle 202, and may include a Navigation (NAV) receiver 238 for receiving and processing a GPS signal, a BLE® Module (BLEM) 240, a Wi-Fi transceiver, a UWB transceiver, and/or other wireless transceivers (not shown in FIG. 2) that may be configurable for wireless communication between the vehicle 202 and other systems (e.g., the mobile device 212), computers, and modules. The TCU 230 may be disposed in communication with the ECUs 210 by way of a bus.

In one aspect, the ECUs 210 may control aspects of vehicle operation and communication using inputs from human drivers, inputs from an autonomous vehicle controller, the vehicle activity detection system 208, and/or via wireless signal inputs received via the wireless connection (s) from other connected devices, such as the mobile device 212, the server(s) 222, among others.

The BCM 224 generally includes integration of sensors, vehicle performance indicators, and variable reactors associated with vehicle systems, and may include processor-based power distribution circuitry that can control functions associated with the vehicle body such as lights, windows, security, vehicle PaaK system/unit (that may include use of UWB transceivers to perform various functions including high-accuracy localization of mobile device), vehicle interior and/or exterior camera(s), audio system(s) including microphones, speakers, door locks and access control, vehicle energy management, and various comfort controls. The BCM 224 may also operate as a gateway for bus and network interfaces to interact with remote ECUs (not shown in FIG. 2).

In some aspects, the DAT controller 232 may provide Level-1 through Level-3 automated driving and driver assistance functionality that can include, for example, active parking assistance, trailer backup assistance, adaptive cruise control, lane keeping, and/or driver status monitoring, among other features. The DAT controller 232 may also provide aspects of user and environmental inputs usable for user authentication.

In some aspects, the automotive computer 204 and/or the vehicle activity detection system 208 may connect with an infotainment system 242 that may include a touchscreen interface portion, and may include voice recognition features, biometric identification capabilities that can identify users based on facial recognition, voice recognition, fingerprint identification, or other biological identification means. In other aspects, the infotainment system 242 may be further configured to receive user instructions via the touchscreen interface portion, and/or display notifications, navigation maps, etc. on the touchscreen interface portion.

The computing system architecture of the automotive computer 204, the VCU 206, and/or the vehicle activity detection system 208 may omit certain computing modules. It should be readily understood that the computing environment depicted in FIG. 2 is an example of a possible implementation according to the present disclosure, and thus, it should not be considered limiting or exclusive.

In accordance with some aspects, the vehicle activity detection system 208 may be integrated with and/or executed as part of the ECUs 210. The vehicle activity detection system 208, regardless of whether it is integrated with the automotive computer 204 or the ECUs 210, or whether it operates as an independent computing system in the vehicle 202, may include a transceiver 244, a processor 246, and a computer-readable memory 248. The transceiver 244 may be configured to receive information/inputs from external devices or systems, e.g., the mobile device 212, the server 222, and/or the like. Further, the transceiver 244 may transmit notifications, information or requests to the external devices or systems. In addition, the transceiver 244 may be configured to receive signals from the sensory system 236 and other vehicle components including UWB transceivers of the TCU 230.

The processor 246 and the memory 248 may be same as or similar to the processor 218 and the memory 220, respectively. Specifically, the processor 246 may utilize the memory 248 to store programs in code and/or to store data for performing aspects in accordance with the disclosure. The memory 248 may be a non-transitory computer-readable memory storing the vehicle activity detection program code, and may include a vehicle database 250 and a UWB information database 252. The vehicle database 250 may include information associated with vehicle drive type (whether the vehicle 202 is a front wheel drive or a rear wheel drive), tire pressure, etc. The UWB information database 252 may store distances measured by UWB sensors (e.g., UWB sensors A1-A6 and BUN as described in conjunction with FIG. 1), threshold values associated with different UWB sensors, etc. The threshold value(s) may indicate a baseline distance between the UWB sensor and the ground, e.g., when the vehicle may have been initially parked on the ground. The details of the UWB sensors and the vehicle activity detection system 208 may be understood in conjunction with FIGS. 3-8.

Figure 3:
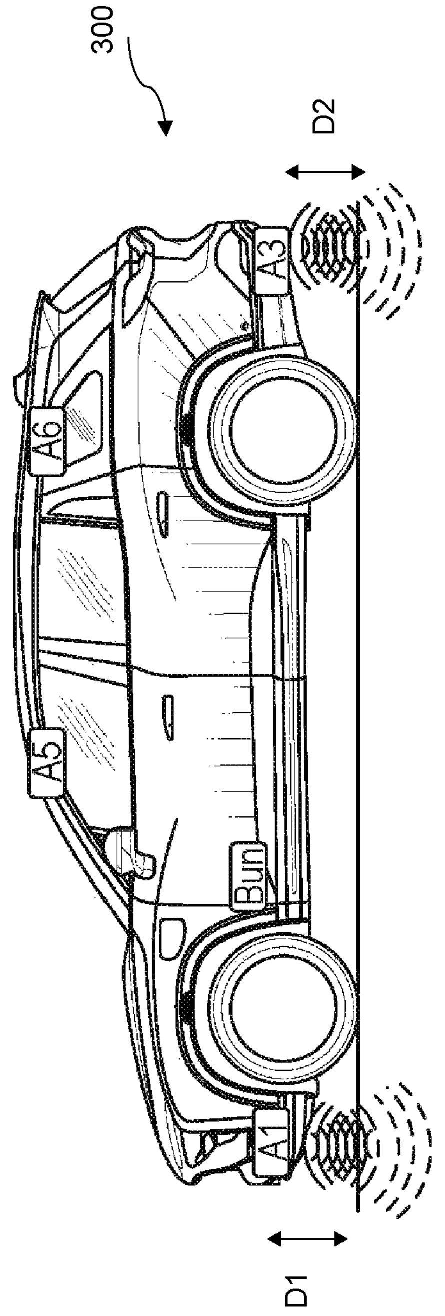
FIG. 3 illustrates an example vehicle having UWB transceivers/sensors used in a radar mode, in accordance with the present disclosure.

FIG. 3 illustrates a vehicle 300 having UWB transceivers/sensors used in a radar mode, in accordance with the present disclosure. The vehicle 300 may be same as vehicle 100 or 202. FIG. 3 specifically illustrates a vehicle 300 left side view.

The vehicle 300 may include UWB sensors (e.g., the UWB sensors A1-A6 and the BUN described above in FIGS. 1 and 2). Although the UWB sensors A2 and A4 are not shown in FIG. 3, a person ordinarily skilled in the art may appreciate that the UWB sensors A2 and A4 may be installed at a vehicle 300 right side (complementary to UWB sensor A1 and A3 positions).

In some aspects, the UWB sensors A1-A4 may be used in the radar mode to perform vehicle activity detection functions (including vehicle inclination and other vehicle activity performed by an unauthorized person). Specifically, the UWB sensors A1-A4 may be configured to perform radar measurements. For example, the UWB sensors A1-A4 may measure distance from a surface below the vehicle 300 by sending UWB signals. The surface may be the ground or parking floor. It should be noted that some UWB signals may penetrate the ground and some may reflect directly back. Some may also reflect back over dozens of multi-paths before returning to the UWB sensors A1-A4.

In some aspects, the transceiver 244 may be configured to receive signals from the UWB sensors A1-A4. The signals may be indicative of a distance between respective UWB sensor and the surface below the vehicle 300. For example, the transceiver 244 may receive a first signal from the UWB sensor A1 (disposed at a vehicle 300 front portion) and a second signal from the UWB sensor A3 (disposed at a vehicle 300 rear portion). The first signal may be indicative of a first distance between the vehicle front portion and the surface below the vehicle 300, and the second signal may be indicative of a second distance between the vehicle rear portion and the surface below the vehicle 300.

The transceiver 244 may send distances (e.g., the first distance and the second distance) associated with the received signals to the memory 248 for storage purpose. The processor 246 may be configured to obtain/receive the distances from the memory 248 (or directly from the transceiver 244). Responsive to obtaining the distances associated with the signals, the processor 246 may be configured to determine whether the vehicle 300 is at an incline, based on at least one of the first signal and the second signal.

Specifically, the processor 246 may be configured to obtain the threshold values associated with the respective UWB sensors from the UWB information database 252. For example, the processor 246 may obtain a first threshold value associated with the UWB sensor A1 and a second threshold value associated with the UWB sensor A3. The threshold values may be associated with a baseline distance between the UWB sensor and the ground or parking floor. For example, the threshold value for the UWB sensor A1 and A3 may be one foot, when the vehicle 300 is parked on a level ground.

In some aspects, the threshold values for all UWB sensors may be same. In other aspects, the threshold values of UWB sensors may be different from each other. For example, if the vehicle 300 is stationed on an uneven surface, the threshold values may be different for different UWB sensors. In addition, if the vehicle 300 is loaded with heavy cargo at a vehicle 300 rear portion, the threshold values may be different for different UWB sensors. A person ordinarily skilled in the art may appreciate that regardless of whether the vehicle 300 is stationed on an incline or the vehicle 300 is loaded with heavy cargo, the baseline distance between the UWB sensors and the ground may exist, which may be established by using the UWB sensors A1-A4 in a UWB radar mode.

Responsive to obtaining the distances measured by the UWB sensors A1-A4 and the respective threshold values, the processor 246 may be configured to compare the distances received by the UWB sensors with the respective threshold values. For example, when the vehicle 300 is parked on the ground as shown in FIG. 3, the UWB sensors A1 and A3 may measure a distance D1 and a distance D2 from the ground, respectively. The processor 246 may compare the distance D1 with the first threshold, and may determine that the vehicle 300 is not at an inclination based on the comparison. For example, if the distance D1 is same as or equivalent to the first threshold the processor 246 may determine that the vehicle 300 is not at an incline. Similarly, the processor 246 may compare the distance D2 with the second threshold, and may determine that the vehicle 300 is not at an inclination based on the comparison. The details of such determination may be understood from the examples mentioned below.

Figure 4:
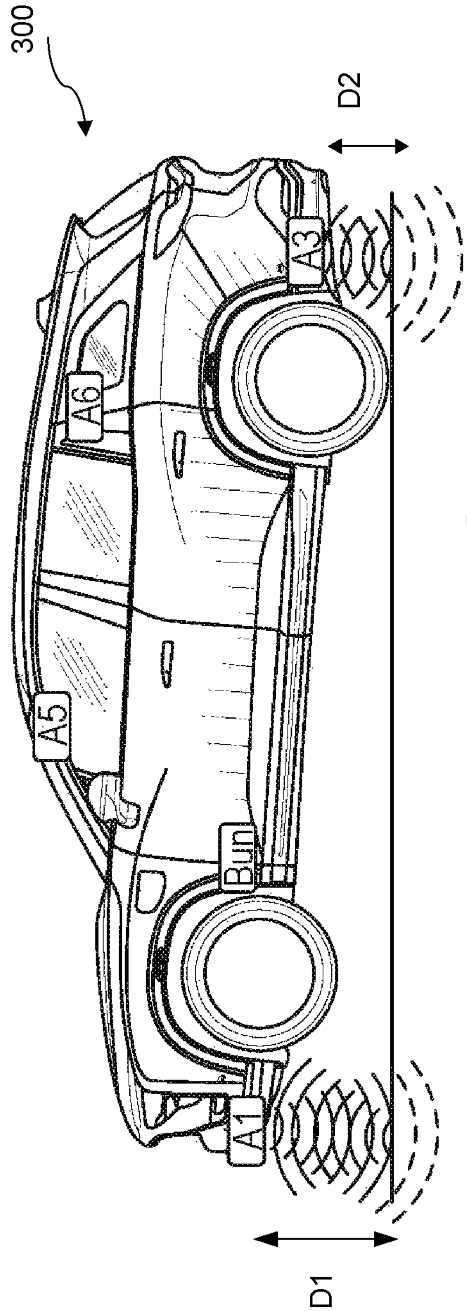
FIGS. 4 and 5 illustrate example embodiments to detect vehicle inclination activity, in accordance with the present disclosure.
Figure 5:
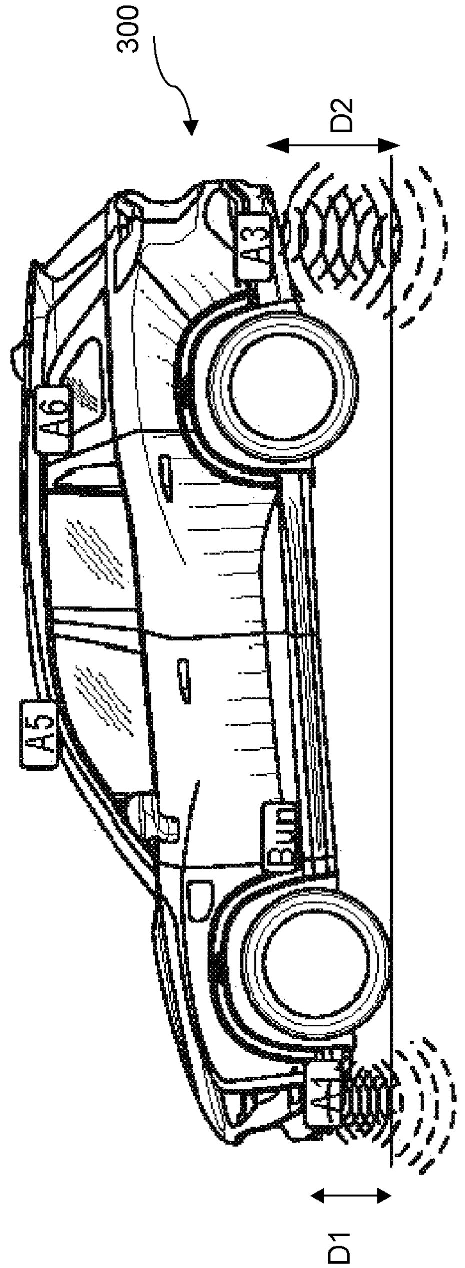

FIGS. 4 and 5 illustrate example embodiments to detect vehicle inclination activity, in accordance with the present disclosure. In particular, FIG. 4 shows that the vehicle 300 may be lifted from the front (for example, during a typical towing procedure for a front wheel drive (FWD) vehicle). In such scenario, the processor 246 may obtain vehicle 300 distance from the ground from one or more UWB sensors and their respective threshold values from the memory 248. For example, the processor 246 may obtain the distance D1 from the UWB sensor A1 (and/or A2) and/or the distance D2 from the UWB sensor A3 (and/or A4).

Responsive to obtaining the distance(s) and the respective threshold value(s), the processor 246 may determine that the distance D1 between the UWB sensors A1, A2 and the ground (as measured by the UWB sensors A1, A2) may be greater than the corresponding threshold values. In addition, the processor 246 may determine that the distance D2 between the UWB sensors A3, A4 and the ground (as measured by the UWB sensors A3, A4) may be less than the corresponding threshold values. This may be because a vehicle 300 front portion may be elevated (and consequently a vehicle 300 rear portion may move closer to the ground), as shown in FIG. 4.

The processor 246 may further correlate the distances measured by the different UWB sensors and may determine that the vehicle 300 may be lifted from the vehicle 300 front portion. For example, when the processor 246 determines that the distance D1 is greater than the respective threshold value and the distance D2 is less than the respective threshold value, the processor 246 may determine that the vehicle 300 may be lifted from the vehicle 300 front portion. Based on the determination that the vehicle 300 may be lifted, the processor 246 may be configured to notify the user 214. In particular, the processor 246 may transmit a notification, via the transceiver 244, to the mobile device 212. In additional aspects, the processor 246 may transmit the notification to the infotainment system 242. The notification may include a text message, an audio message and/or the like to inform the user 214 about the unauthorized activity (i.e., vehicle 300 lifting or inclination). In some aspects, the processor 246 may activate a vehicle alarm (or any other vehicle component) to indicate the vehicle unauthorized activity.

FIG. 5 illustrates another example embodiment to detect vehicle 300 inclination activity, in accordance with the present disclosure. As shown in FIG. 5, the vehicle 300 may be lifted from the rear (for example, during a typical towing procedure for a rear wheel drive (RWD) vehicle). In this case too, the processor 246 may obtain the vehicle 300 distance from the ground from one or more UWB sensors and their respective threshold values. For example, the processor 246 may obtain the distance D1 from the UWB sensor A1 (and/or A2) and/or the distance D2 from the UWB sensor A3 (and/or A4).

Responsive to obtaining the distance(s) and the respective threshold value(s), the processor 246 may determine that the distance D2 between the UWB sensors A3, A4 and the ground (as measured by the UWB sensors A3, A4) may be greater than the corresponding threshold values. In addition, the processor 246 may determine that the distance D1 between the UWB sensors A1, A2 and the ground (as measured by the UWB sensors A1, A2) may be less than the corresponding threshold values. This may be because the vehicle 300 rear portion may be elevated, as shown in FIG. 5.

The processor 246 may be further configured to correlate the distances measured by the different UWB sensors and may determine that the vehicle 300 may be lifted from the vehicle 300 rear portion. Based on the determination that the vehicle 300 may be lifted, the processor 246 may be configured to notify the user 214, as discussed in conjunction with FIG. 4.

Figure 6:
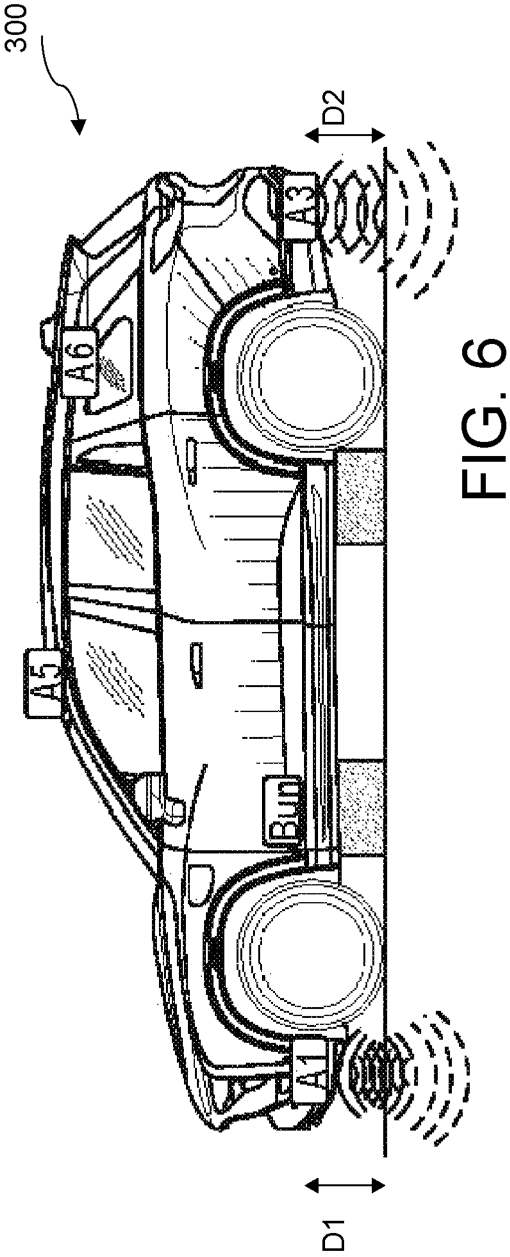
FIG. 6 illustrates an example embodiment to detect vehicle tire theft activity, in accordance with the present disclosure.

FIG. 6 illustrates an example embodiment to detect vehicle 300 tire theft activity, in accordance with the present disclosure. Typically, an individual attempting to steal vehicle tires may position cinderblocks under vehicle chassis, and may then loosen lug nuts on each tire. Thereafter, the individual may release air from the tires and lower the vehicle 300. When the vehicle 300 is lowered and rests on the cinderblocks, the individual may remove the tires. In such scenarios, the processor 246 may use the UWB sensors (A1-A4) to detect the vehicle 300 tire theft activity, as described below.

The UWB sensors (A1-A4) may measure the distances between the respective UWB sensors and the ground. The processor 246 may be configured to obtain the measured distances (e.g., the distances D1 and D2) and detect activity associated with the vehicle 300 tire theft based on the measured distances. In particular, the processor 246 may compare the measured distances with the respective threshold values to determine the activity associated with the vehicle 300 tire theft. For example, if the distances D1 and D2 are less than the respective threshold values, the processor 246 may determine that the individual may have deflated the vehicle 300 tires and may be attempting to steal the vehicle 300 tires. The processor 246 may notify the user 214, responsive to a vehicle 300 tire theft activity determination.

In some aspects, each tire sensor included in the VPS 234 may send tire pressure periodically (for example, every one to five seconds) to the transceiver 244 when the vehicle 300 may be parked. The transceiver 244 may receive the pressure and may store/record Pounds per Square Inch (PSI) of tires in the memory 248 (i.e., the vehicle database 250) for a time duration when the vehicle 300 may be parked. The processor 246 may obtain the PSI from the vehicle database 250, and may adjust the threshold values (or the baseline distance) for the time duration to approximate the change in vehicle 300 height that would occur for the observed PSI drop. In some aspects, the PSI may drop when the vehicle 300 is parked for a longer time duration (e.g., days or weeks), and hence may result in change in the vehicle 300 height. A person ordinarily skilled in the art may appreciate that the processor 246 may prevent false alarm by adjusting the threshold values.

In further aspects, the processor 246 may determine whether the individual may be attempting to steal vehicle tire(s) from driver front side, driver rear side, passenger front side and/or passenger rear side. For example, when the individual places the cinderblocks on the driver front side, the passenger front side may tilt. In such scenarios, a distance measured by the UWB sensor A1 from the ground may be different from the distance measured by the UWB sensor A2 from the ground. Similarly, when the individual places the cinderblocks on the driver rear side, the passenger rear side may tilt. In this scenario also, a distance measured by the UWB sensor A3 from the ground may be different from the distance measured by the UWB sensor A4 from the ground. The processor 246 may receive the measurements from the UWB sensors A1-A4, and may compare the distance measured by the UWB sensor A1 with the distance measured by the UWB sensor A2 to determine the activity associated with the vehicle 300 tire theft in vehicle front side. Similarly, the processor 246 may compare the distance measured by the UWB sensor A3 with the distance measured by the UWB sensor A4 to determine the activity associated with the vehicle 300 tire theft in vehicle rear side.

Figure 7:
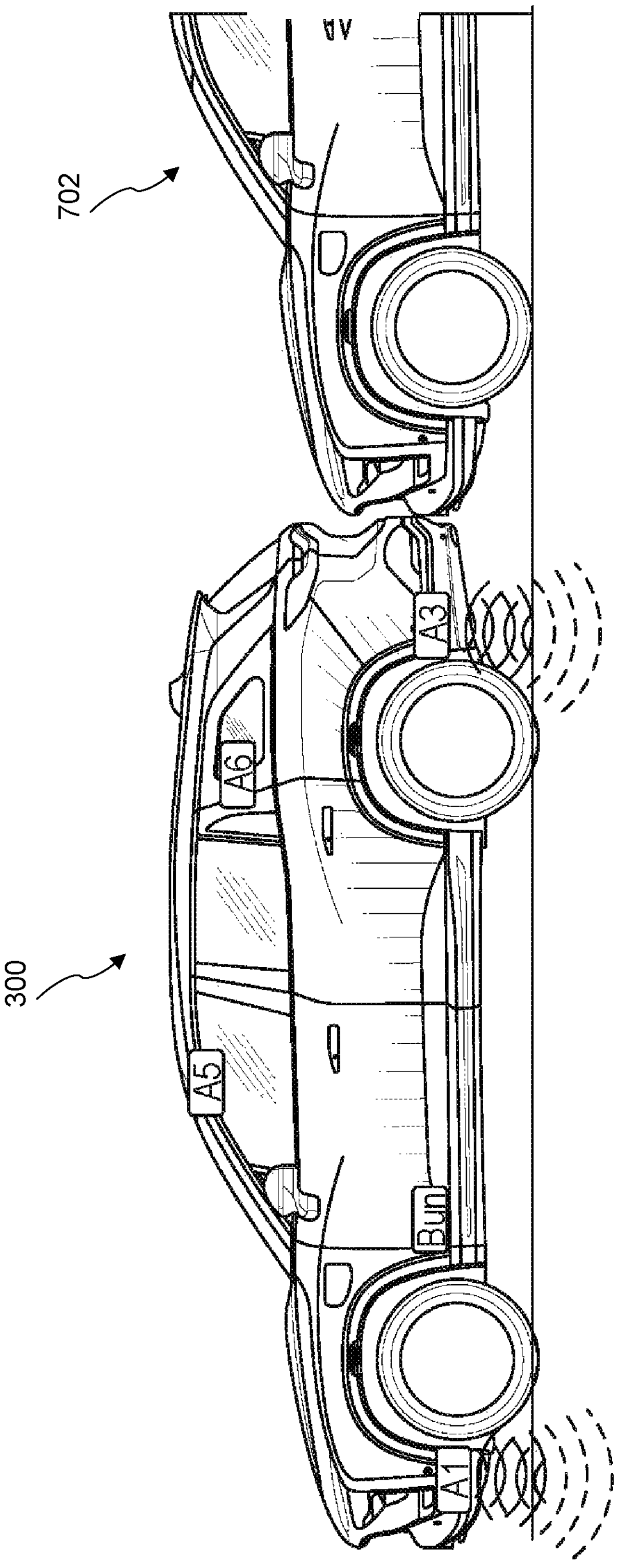
FIG. 7 illustrates an example embodiment to detect vehicle push-away theft, in accordance with the present disclosure.

FIG. 7 illustrates an example embodiment to detect vehicle 300 push-away theft, in accordance with the present disclosure. Typically, an individual attempting to steal the vehicle 300 may use a mechanical shifter override to place the vehicle 300 in neutral, and may then push the vehicle 300 with another vehicle 702. In such scenarios, the processor 246 may use the UWB sensors A1-A4 to detect vehicle 300 push-away activity by the unauthorized person. In particular, the UWB sensors (such as the UWB sensors A3, A4) may measure distances between the respective UWB sensors and the vehicle 702 (or any other object) located in proximity to the vehicle 300 rear portion (or the vehicle 300 front portion, by using the UWB sensors A1, A2). The UWB sensors may transmit the measured distance information to the transceiver 244.

The processor 246 may obtain the distance information from the transceiver 244 and detect activity in areas associated with vehicle 300 rear or front bumpers. In particular, the processor 246 may obtain signals indicative of distances between the UWB sensors and the vehicle 702, and compare the measured distances with the respective threshold values (e.g., the baseline distance, stored in the memory 248). Based on the comparison, the processor 246 may detect whether an individual is attempting to push the vehicle 300 to a new location.

Figure 8:
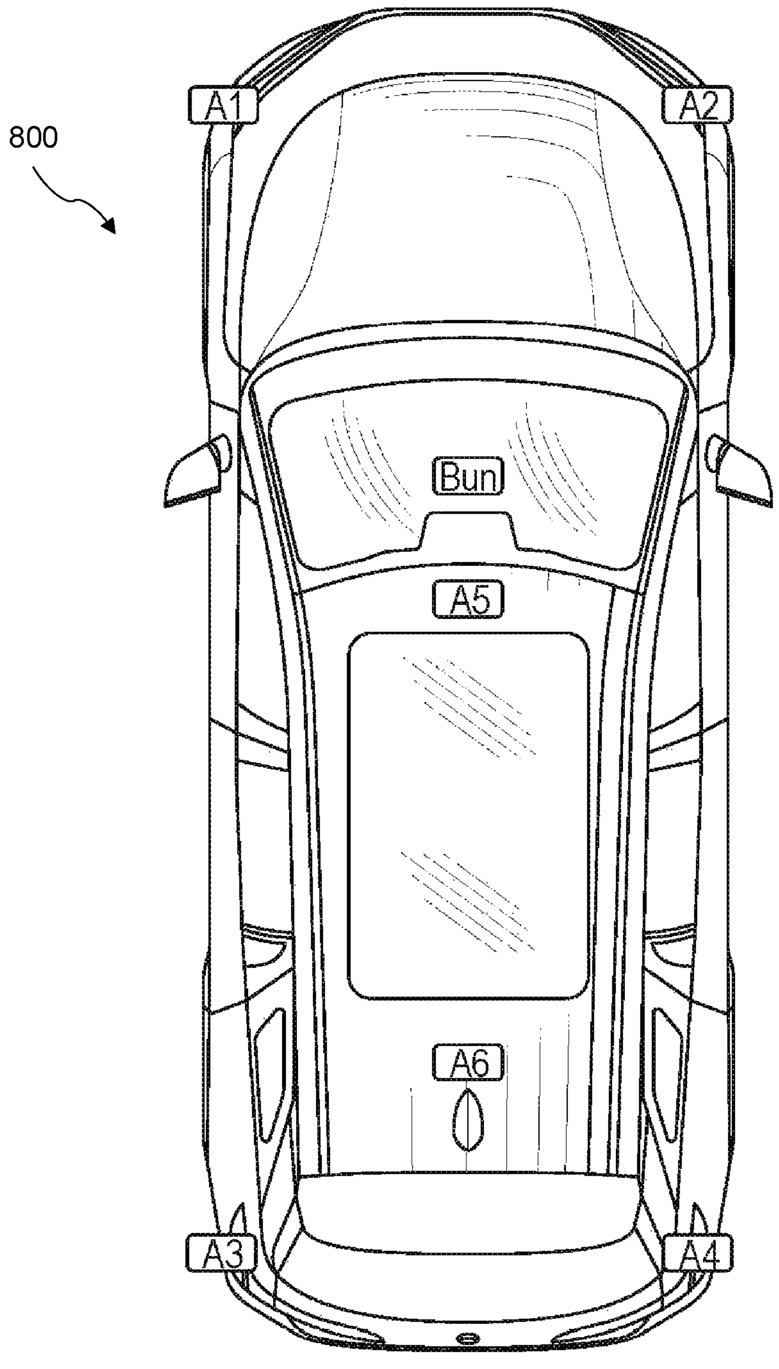
FIG. 8 illustrates example modes to activate UWB transceivers/sensors, in accordance with the present disclosure.

FIG. 8 illustrates example modes to activate UWB transceivers/sensors, in accordance with the present disclosure. FIG. 8 illustrates a vehicle 800 that may include the BUN and the UWB sensors A1-A6. The vehicle 800 may be same as the vehicle 100, 202, or 300.

In some aspects, the processor 246 may be configured to activate the UWB sensors A1-A6 in different modes and/or activate the UWB sensors A1-A6 to provide signal samples at a predetermined rate/frequency. Activation of UWB sensors A1-A6 is different modes and/or causing the UWB sensors A1-A6 to provide signals at predetermined frequencies may result in key offload (KOL) reductions, and hence may enhance vehicle 800 operational efficiency.

As one non-limiting example, to perform vehicle cabin activity sensing, the processor 246 may activate two UWB sensors and sample the cabin periodically at a predetermined rate (for example, every 100 millisecond (ms) and/or at any other time interval). Continuing this non-limiting example, the approach may consume one milliampere (mA) average KOL. Based on this estimate, it may be determined that each exterior UWB sensor (e.g., A1-A4), sampling at 125 ms, may draw an average of 0.5 mA KOL (or 1 ma per pair or 2 mA for all four UWB sensors).

Based on this, the long-term average key offload (KOL) draw from the exterior UWB sensors A1-A4 may be minimized as follows. As an initial step, when the vehicle 800 is parked, a baseline may be established using all four exterior UWB sensors A1 through A4 (and/or any other number of exterior sensors). Then, to minimize KOL, one of the strategies or modes described below may be utilized.

In a first mode, e.g., a "Single-Anchor Trigger" mode for front wheel drive (FWD) vehicle, the processor 246 may activate a first UWB sensor (e.g., the UWB sensor A1 or the UWB sensor A2). In some aspects, the processor 246 may activate the first UWB sensor A1 or A2 when the vehicle 800 is a front wheel drive (FWD). Responsive to the UWB sensor A1 or A2 activation, the processor 246 may obtain a first signal (indicative of the first distance measured by the UWB sensor) from the activated UWB sensor. The processor 246 may determine whether the vehicle 800 is at an incline based on the first signal. In particular, the processor 246 may compare the first distance with the respective UWB sensor threshold value, and may determine probability of vehicle 800 being at an incline.

In some aspects, the processor 246 may be configured to activate a second UWB sensor (e.g., the UWB sensor A3 or the UWB sensor A4) responsive to a determination that the vehicle 800 is at the incline based on the first signal (i.e., when the first distance is greater than the threshold value). The processor 246 may obtain a second signal from the second UWB sensor, and determine whether the vehicle 800 is at the incline based on the second signal. The processor 246 may activate the other sensor to gain confidence or to confirm whether the vehicle 800 is at the incline.

In some aspects, the processor 246 may activate the first UWB sensor (e.g., the UWB sensor A1 or A2) such that the first UWB sensor may sample/capture signals at a first predetermined rate/frequency (such as every 125 ms), which may limit inclination monitoring steady-state KOL to around 0.5 mA. Stated another way, the first UWB sensor may provide signal samples at the first predetermined rate in the first mode.

In a second mode, e.g., a "Single-Anchor Trigger" for rear wheel drive (RWD) vehicle, the processor 246 may activate the second UWB sensor A3 or A4 first, and then activate the first UWB sensor A1 or A2 to gain confidence. In some aspects, the processor 246 may activate the second mode when the vehicle 800 is rear wheel drive (RWD).

Alternatively, the processor 246 may be configured to activate the first UWB sensor A1/A2 and the second UWB sensor A3/A4 in an alternate manner, such that the first UWB sensor and the second UWB sensor may sample the signals in an alternate manner. Each first UWB sensor A1/A2 may sample at a second predetermined rate that may be greater than the first predetermined rate. For example, UWB sensors A1 and A4 may alternate such that each is sampling at, for example, 250 ms so that the combined sample rate (125 ms) may still limit inclination monitoring steady-state KOL to around 0.5 mA. This mode may provide better coverage and allow a common strategy for both FWD and RWD vehicles. In this case as well, further sensors A2 and/or A3 may be activated to gain confidence.

In a third mode, e.g., a "Single-Anchor Trigger based on Large Delta" mode, the processor 246 may utilize other sensors (the second UWB sensor) to gain confidence, when the probability/confidence of vehicle 800 being at the incline is small (or when distance "delta" is small, or when the vehicle 800 may just begin to incline). For example, when the difference ("delta") between the distance measured by the first UWB sensor and the corresponding threshold value is small, the processor 246 may activate the third mode. However, if the distance delta is changing quickly and is large, the processor 246 may gain high confidence of vehicle 800 inclination by using just one sensor (e.g., the first UWB sensor).

In a fourth mode, e.g., a "Round Robin Trigger", the processor 246 may activate one UWB sensor/anchor at a time at a third predetermined rate. The third predetermined rate may be greater than the second predetermined rate (which may be, e.g., 250 ms). For example, each UWB sensor may sample at 500 ms in the fourth mode. This may allow the combined sample rate (125 ms) to still limit inclination monitoring steady-state KOL to around 0.5 mA. This may also provide better coverage and may allow a common strategy for both FWD and RWD vehicles. Further, some or all sensors may be activated to gain confidence if any single sensor finds evidence of an incline in progress.

In a fifth mode, e.g., "Camera Support" mode, the processor 246 may activate additional vehicle component such as vehicle cameras (for example 360-degree vehicle cameras, lane departure assistance camera and/or lane keep assist (LKA) cameras, or Facial Recognition side cameras, as well as any other cameras), when the processor 246 obtains any trigger/indication that the vehicle 800 is at the incline, in the first mode or the second mode. Stated another way, any trigger of UWB sensor from the first strategy/mode and/or the second strategy/mode may also result in a strategy decision to activate any vehicle 800 camera. To save power, the processor may power those cameras for a visual check that correspond to a UWB sensor zone that detects the vehicle 800 inclination.

In a sixth mode, e.g., "Crowd-Sourced Camera Support", the processor 246 may activate cameras of adjacent vehicles or buildings or homes (e.g., residential security cameras) to support the anti-theft monitoring or make a record of activity in the case where the vehicle 800 does not have cameras or an adequate number of cameras. In particular, the processor 246 may transmit a notification to such cameras via the transceiver 244 and/or the mobile device 212. In some aspects, the mobile device 212 may include an application to activate/deactivate such cameras.

In a seventh mode, e.g., "Ultraslow Sample Rate in Non-European Markets", the inclination sensing rate of approximately 125 ms may be based on allowing the processor 246 to gain confidence on an event trigger through the use of several samples and then set-off a vehicle 800 security alarm with 1,000 ms, as prescribed by the European ECE-116 Vehicle Alarm System (VAS) guideline. In non-ECE (Economic Commission for Europe) markets such as most countries outside of Europe, the scan rate may be slowed significantly (for example two to three seconds to alarm) because any inclination attempt may take some time to start moving the vehicle 800 up.

A person ordinarily skilled in the art may appreciate that the processor 246 may activate the UWB sensors A1-A6 in other combinations of scan rate and/or mix of UWB sensors.

It should be noted that while specific UWB sensors (or anchors) A1-A6 are described above, any UWB sensors may be used and/or any combination of sensors may also be used. Additionally, any other scan rates may also be used. Furthermore, the parameters used to provide examples of the afore-mentioned strategies are merely exemplary (for example, the sampling rate, average draw, etc.) and are not intended to be limiting. In this manner, the specific examples provided above are not intended to be limiting in any way.

Figure 9:
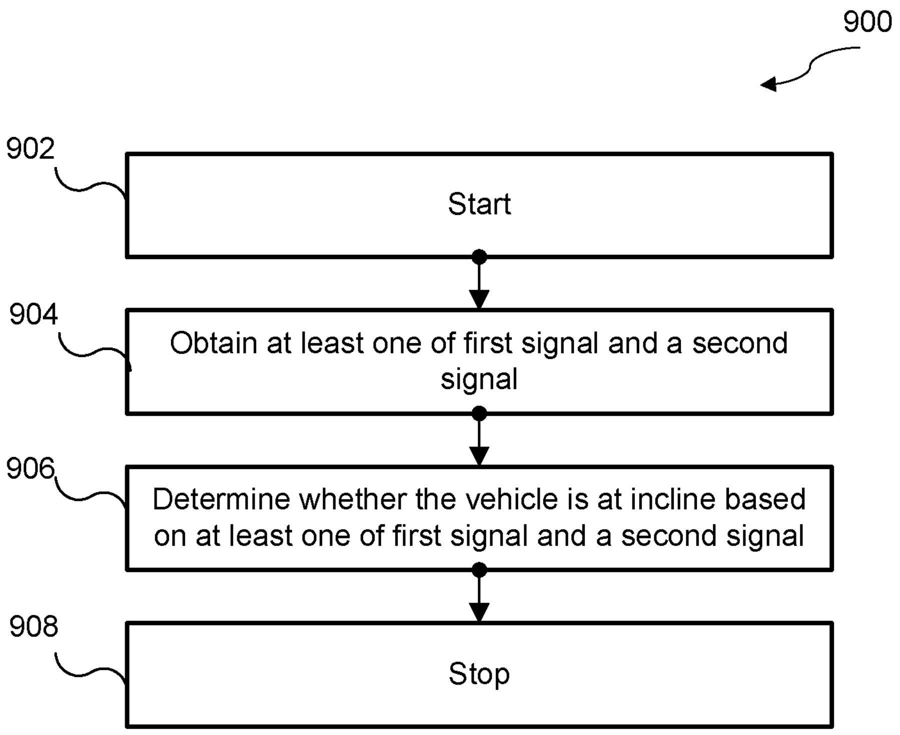
FIG. 9 depicts a flow diagram of an example method for detecting vehicle inclination and other vehicle activity, in accordance with the present disclosure.

FIG. 9 depicts a flow diagram of an example method 900 for detecting vehicle inclination and other vehicle activity, in accordance with the present disclosure. FIG. 9 may be described with continued reference to prior figures, including FIGS. 1-8. The following process is exemplary and not confined to the steps described hereafter. Moreover, alternative embodiments may include more or less steps that are shown or described herein and may include these steps in a different order than the order described in the following example embodiments.

Referring to FIG. 9, at step 902, the method 900 may commence. At step 904, the method 900 may include obtaining or receiving, by the processor 246, at least one of a first signal from a first UWB sensor (such as the UWB sensor A1 or A2) disposed in the vehicle 300 and a second signal from a second UWB sensor (such as the UWB sensor A3 or A4) disposed in the vehicle 300. In some aspects, the first signal may be indicative of a first distance between the vehicle 300 front portion and a surface below the vehicle 300, and the second signal may be indicative of a second distance between the vehicle 300 rear portion and a surface below the vehicle 300.

At step 906, the method 900 may include determining, by the processor 246, whether the vehicle 300 is at the incline based on at least one of the first signal and the second signal. In particular, the processor 246 may compare the first distance with a first threshold value associated with the first UWB sensor and may determine whether the vehicle 300 is at the incline based on the comparison. Similarly, the processor 246 may compare the second distance with a second threshold value associated with the second UWB sensor and may determine whether the vehicle 300 is at the incline. In some aspects, the processor 246 may correlate both the comparisons to determine whether the vehicle 300 is at the incline at the vehicle 300 front portion or the vehicle 300 rear portion.

The method 900 may end at step 908.

The method 900 may include an additional step (not shown in FIG. 9) of notifying the user 214 when the processor 246 determines that the vehicle 300 is at the incline. As described in conjunction with previous figures, the processor 246 may send, via the transceiver 244, a notification to the mobile device 212 when the processor 246 determines that the vehicle 300 is at the incline. The notification may act as an alarm for the user 214 to indicate that an unauthorized person may be attempting to access the vehicle 300.

A person ordinarily skilled in the art may appreciate that the systems and methods, as described above, assist the user 214 in preventing unauthorized access to the vehicle 300. The systems and methods may also provide a number of additional benefits. As a first example, one UWB sensor or alternating two UWB sensors may be used to keep the key off load (KOL) down to 50% (or any other percentage) of a conventional or typical vehicle inclination sensing system. As a second example, the systems and methods provide for the detection of cinderblock-based tire theft. As a third example, the systems and methods provide for detection methods for push-away theft. As a fourth example, the systems and methods enable an approximate 25% (or any other percentage) reduction in KOL over the conventional vehicle sensing modules that detect unusual vehicle activity. As a fifth example, the systems and methods reduce calibration steps that may otherwise be associated with systems that use the conventional vehicle sensing modules.

In additional aspects, the UWB-based inclination sensing system, as described above, may also be used to detect cabin activity. In this case, the detection may be performed using two UWB sensors that may be activated by the processor 246 in any mode described above, and sample the cabin periodically (for example, every 100 ms and/or at any other time interval). This approach may consume 1 mA average KOL. However, in some cases, the approach may also consume any other average KOL and the UWB-based inclination sensing may not need to remain below 1 mA.

Figure 10:
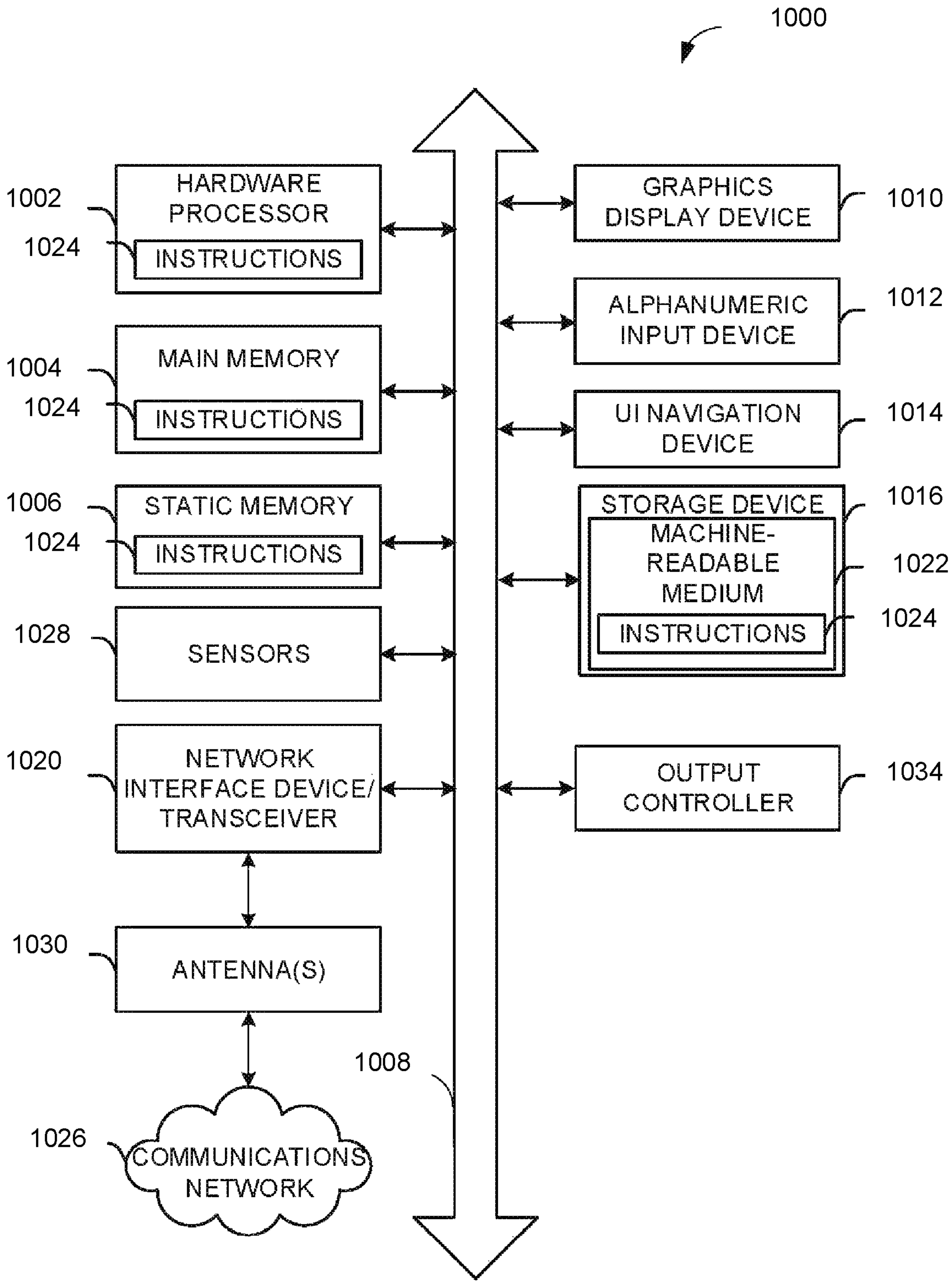
FIG. 10 illustrates an example computing system in accordance with the present disclosure.

FIG. 10 depicts a block diagram of an example machine 1000 upon which any of one or more techniques (e.g., methods) may be performed, in accordance with one or more example embodiments of the present disclosure. In other embodiments, the machine 1000 may operate as a standalone device or may be connected (e.g., networked) to other machines. In some aspects, the machine 1000 may be another embodiment of the vehicle activity detection system 208.

In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a dedicated ECU, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit, not shown), a network interface device/transceiver 1020 coupled to antenna(s) 1030, and one or more sensors 1028, such as a global positioning system (GPS) sensor, a compass, an accelerometer, or other sensor. The machine 1000 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine readable medium 1022 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth□, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a first sensor and a second sensor;

a memory configured to store computer-executable instructions; and a processor configured to access the memory and execute the computer-executable instructions to:

receive a first signal from the first sensor, wherein the first signal is indicative of a first initial distance between the vehicle and a surface below the vehicle;

receive a second signal from the first sensor, wherein the second signal is indicative of a second distance between the vehicle and the surface below the vehicle;

determine a difference between the second distance and the first distance;

compare the difference to a first threshold value associated with the first sensor;

activate the second sensor responsive to a determination that the difference is less than the first threshold value;

receive a third signal from the second sensor, wherein the third signal is indicative of a third distance between the vehicle and the surface below the vehicle; and determine, based on the second signal and the third signal, that the vehicle is at an incline relative to the surface below the vehicle, with at least one wheel raised off the surface below the vehicle.

2. The vehicle of claim 1, wherein the first sensor is positioned at a vehicle front portion, and wherein the processor is further configured to determine, based on the determination that the vehicle is at an incline relative to the surface, that an attempted theft of the vehicle is occurring.

3. The vehicle of claim 1, wherein the second sensor is positioned at a vehicle rear portion.

4. The vehicle of claim 3, wherein the processor is further configured to:

compare the second distance with a second threshold value associated with the first sensor; and determine, based on comparing the second distance with the second threshold value, that the vehicle is at the incline.

5. The vehicle of claim 1, wherein the processor is further configured to activate an additional vehicle component.

6. The vehicle of claim 5, wherein the additional vehicle component is a vehicle camera.

7. The vehicle of claim 1, wherein the processor is further configured to activate the first sensor and the second sensor in an alternate manner.

8. The vehicle of claim 1, wherein the processor is further configured to activate the first sensor in a first mode, and wherein the first sensor is configured to provide signal samples at a first predetermined rate in the first mode.

9. The vehicle of claim 1, wherein the processor is further configured to activate the first sensor and the second sensor in a second mode, wherein the first sensor and the second sensor are configured to provide signal samples at a second predetermined rate in the second mode, and wherein the first sensor and the second sensor are configured to sample signals in an alternative manner in the second mode.

10. A method comprising:

receiving, via a processor, a first signal from a first UWB sensor of a vehicle;

determining, via the processor and based on the first signal, a first initial distance between the vehicle and a surface below the vehicle;

receiving, via the processor, a second signal from the first sensor, wherein the second signal is indicative of a second distance between the vehicle and the surface below the vehicle;

determining, via the processor, a difference between the second distance and the first distance;

comparing, via the processor, the difference to a first threshold value associated with the first sensor;

activating, via the processor, the second sensor responsive to a determination that the difference is less than the first threshold value;

receiving, via the processor, a third signal from the second sensor, wherein the third signal is indicative of a third distance between the vehicle and the surface below the vehicle; and determining, via the processor and based on the second distance and the third distance, that the vehicle is at an incline relative to a surface below the vehicle with at least one wheel raised off of the surface.

11. The method of claim 10, wherein the first UWB sensor is positioned at a vehicle front portion.

12. The method of claim 10, wherein the second UWB sensor is positioned at a vehicle rear portion.

13. The method of claim 10, further comprising:

activating an additional vehicle component to determine that the vehicle is at the incline based on the first signal and the second signal.

14. The method of claim 10, further comprising activating the first UWB sensor and the second UWB sensor in an alternate manner.

15. A non-transitory computer-readable storage medium having instructions stored thereupon which, when executed by a processor, cause the processor to:

receive a first signal from a first UWB sensor of a vehicle;

determine, based on the first signal, a first distance between the vehicle and a surface below the vehicle;

receive a second signal from the first sensor, wherein the second signal is indicative of a second distance between the vehicle and the surface below the vehicle;

determine a difference between the second distance and the first distance;

compare the difference to a first threshold value associated with the first sensor;

activate the second sensor responsive to a determination that the difference is less than the first threshold value;

receive a third signal from the second sensor, wherein the third signal is indicative of a third distance between the vehicle and the surface below the vehicle; and determine, based on the second distance and the third distance, that the vehicle is at an incline relative to the surface below the vehicle with at least one wheel raised off of the surface; and determine, based on determining that the vehicle is at an incline with at least one wheel raised off the surface, that an attempted vehicle theft is occurring.

16. The non-transitory computer-readable storage medium of claim 15, wherein the first UWB sensor is positioned at a vehicle front portion.

17. The non-transitory computer-readable storage medium of claim 15, wherein the second UWB sensor is positioned at a vehicle rear portion.

* * * * *